Oct. 8, 1968  W. RAU  3,404,901
COUPLING MEANS FOR TOWING VEHICLES
Filed July 18, 1966  4 Sheets-Sheet 1

INVENTOR
Willy Rau

BY
Michael J. Striker
ATTORNEY

INVENTOR.
Willy Rau
BY
Michael S. Striker

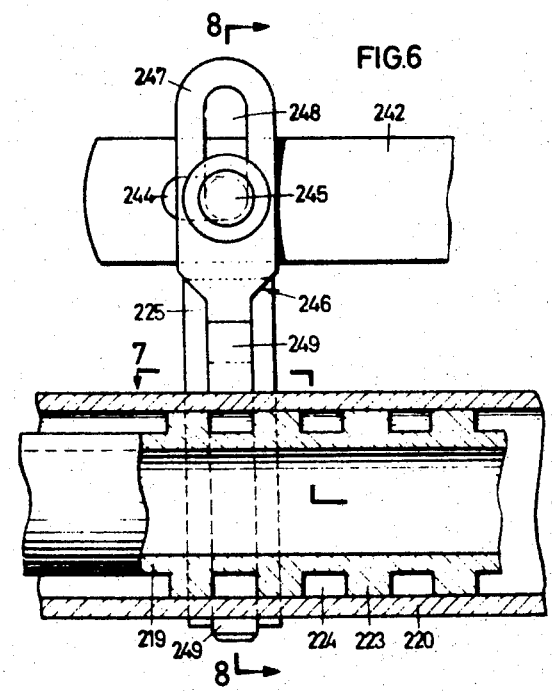
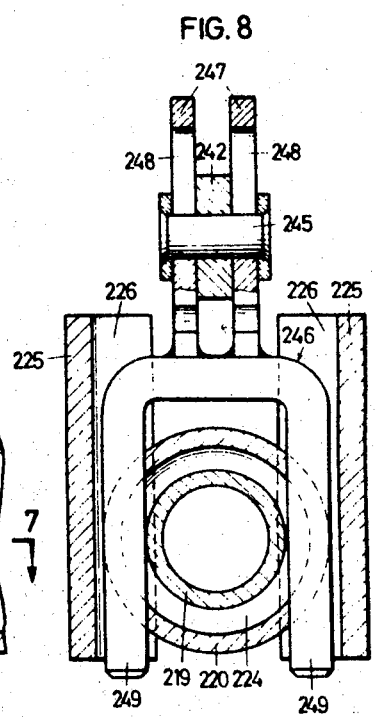
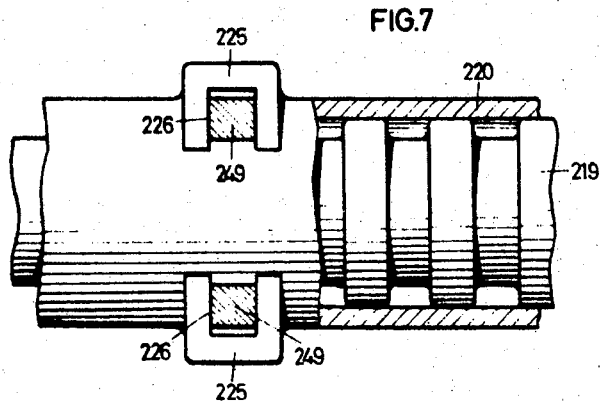

United States Patent Office 3,404,901
Patented Oct. 8, 1968

3,404,901
COUPLING MEANS FOR TOWING VEHICLES
Willy Rau, Kirchheim, Teck, Germany, assignor to
Maschinenfabrik Rau o.H.G.
Filed July 18, 1966, Ser. No. 565,955
Claims priority, application Germany, July 31, 1965,
M 66,183; Apr. 22, 1966, M 69,241
13 Claims. (Cl. 280—456)

ABSTRACT OF THE DISCLOSURE

Coupling means for coupling to a towing member an object to be towed, and including a towing bar having at least two sections adjustable longitudinally with respect to each other, means for locking said two sections against movement in longitudinal direction, a movable coupling member connected to one end of the towing bar, means for operating the coupling member, and operable means connecting the operating means and the locking means for common operation.

---

This invention relates to coupling means, and is applicable particularly to the coupling of towing bars on, for example, tractors to implements to be towed.

According to the invention there is provided coupling means for securing a towing bar to a towing member of an object to be towed, said coupling means comprising a hook member provided at the end of the towing bar, the open side of the hook facing downwardly, a movable retaining member which is pivoted to the hook member and locking means for locking the retaining member is an operative position in which it closes, at least partially, the open side of the hook to prevent disengagement of a towing member therefrom.

The coupling of an object to the towing bar can be effected very simply by means of the invention, for example from the driving seat of a tractor. Thus the towing bar may be pivoted downwards onto the towing member of the object, preferably against the action of a spring, so that the hook member engages with the towing member from above. Operation of the retaining member then causes the towing member to be engaged from below so that it is retained in the hook member.

In a preferred embodiment the towing bar comprises at least two sections which are adjustable longitudinally relative to each other, and in which said locking means comprise a linkage which effects locking of said sections against relative longitudinal movement and locking of the retaining member in its said operative position simultaneously.

Preferably the retaining member is mounted in a slot provided in the hook member so as to pivot about a lateral axis perpendicular to the plane of the slot, said retaining member having a hook-shaped end which, on movement into the operative position, passes through the slot and engages said towing member from below.

In a preferred embodiment of the invention the towing bar comprises two concentric rod-like or tubular sections telescoping into each other, the inner section being provided with a series of spaced apart recesses, and the outer section being provided with at least one aperture and in which a locking member is provided for engagement in both the aperture and a selected said recess to lock said sections longitudinally relative to each other. Preferably the locking member is forked.

Since in the preferred embodiment the locking means secures the engagement of the towing member and at the same time is used to lock the longitudinally adjustable towing bar sections in a desired relative position, both securing processes can be effected by a single movement of a manual lever.

Preferably the longitudinal adjustment of the towing bar as described is only used for coarse adjustment. Advantageously, precise adjustment is also provided, which may be in the conventional fashion by means of two screw-threaded parts forming part of one of the two towing bar sections.

According to a preferred feature of the invention, the retaining member comprises a pivoted lever the free end of which may be locked in the operative position. In this way inadvertent opening of the coupling means under certain high towing loads can be avoided.

The locking arrangement for the pivoted lever preferably comprises a locking lever pivotally mounted on the retaining member and supported in its locking position by a locking catch provided on the towing bar. Said locking lever may be urged by a spring into its locking position.

Said locking lever preferably has a first lever arm which engages the locking catch and a second lever arm which is disposed near a manually actuated third lever arm on the retaining member so that an operator can actuate said second and third lever arms simultaneously with one hand. In a preferred construction said first lever arm engages a detent on the locking catch in the locking position and is urged into said locking position by a spring acting on the end of the first lever arm through an intermediate lever mounted on the towing bar.

In this way an operator can if necessary, with one hand, both unlock and open the coupling means, adjust the upper towing bar into a desired position, couple the bar to the towing member of the object to be towed, and then close the coupling means while at the same time releasing the locking means to lock the coupling means in engagement with the towing member and simultaneously lock the towing bar at the desired length.

The invention will be described, by way of example only, with reference to the accompanying drawings, in which:

FIGURE 6 is an enlarged fragmentary side view of the towing bar and of the coupling means, partly in section;

FIGURE 7 is a cross section along the line 7—7 in FIGURE 6;

FIGURE 8 is a cross section along the line 8—8 in FIGURE 6;

Figure 1:
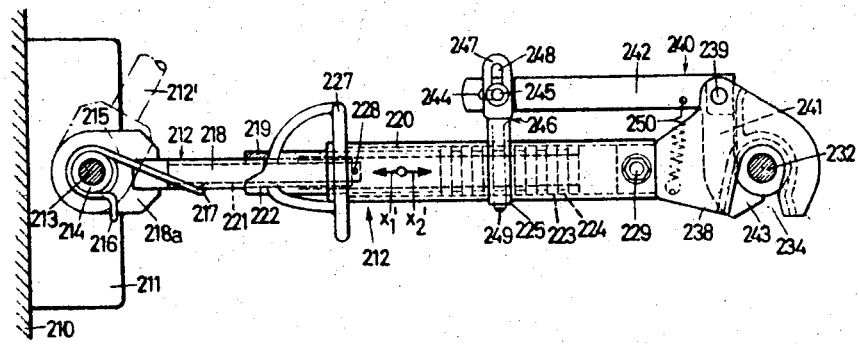
FIGURE 1 is a general side view of coupling means according to one embodiment of the invention, partly in cross section along the line 1—1 in FIGURE 2.
Figure 2:
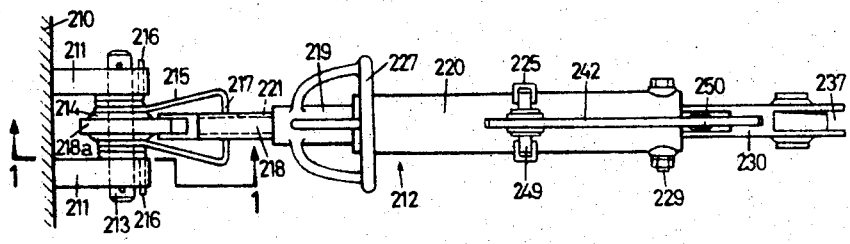
FIGURE 2 is a plan view of the embodiment of FIGURE 1.
Figure 3:
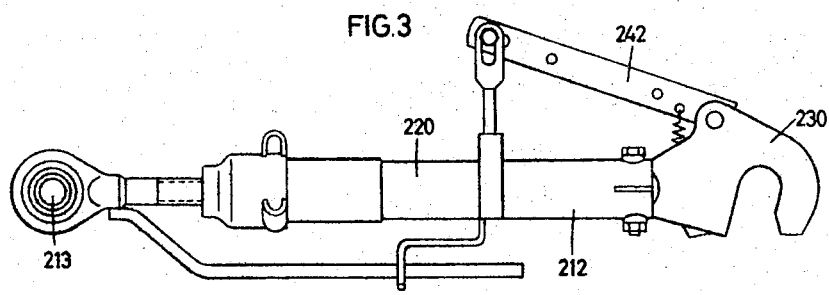
FIGURE 3 is a side view of the coupling means, similar to that of FIGURE 1, but in a slightly modified form.

Referring to FIGURES 1 to 8 a towing drawbar 212 of a three-point towing linkage is pivoted to a tractor 210 behind the driving seat thereof in bearing blocks 211 by means of spigot 213 and ball joint piece 214. The drawbar 212 may be raised by a double helical spring 215, the free ends 216 of which engage under the bearing blocks 211 and the central portion 217 of which engages under the drawbar 212. When uncoupled, the drawbar 212 is raised to the position 212' indicated by dotted lines.

The drawbar 212 comprises three members adjusted in length: a rod-like inner member 218 and the two tubular sections 219 and 220 which telescope into each other.

The inner tubular section 219 has an internally screw-threaded portion 222 which meshes with a screw thread 221 on the member 218. To the rear of the screw-threaded portion 222, that is, to the right in the drawings, the tubular section 219 is provided with a portion 223 of larger diameter which is provided with annular equidistantly spaced grooves 224 on its external surface.

The outer tubular section 220 is provided by welding with two channel-section guide members 225, each enclosing an aperture in the wall of the section 220 and extending vertically to define respective guide slots 226 of rectangular cross section (FIGURE 6).

A handwheel 227 is welded on the end of the inner tubular section 219 which protrudes beyond the outer tubular section 220. The handwheel 227 enables the inner tubular section 219 to be rotated relatively to the member 218 and moved relatively thereto in the direction of arrows $x_1$–$x_2$ by means of the screw threads 221 for fine adjustment of the length of the drawbar 212. To prevent the member 218 from being screwed out of the tubular section 219 completely, a locking pin 228 is inserted in a transverse hole at the end of the member 218, the length of the locking pin 228 being approximately the same as the internal diameter of the section 219.

Figure 4:
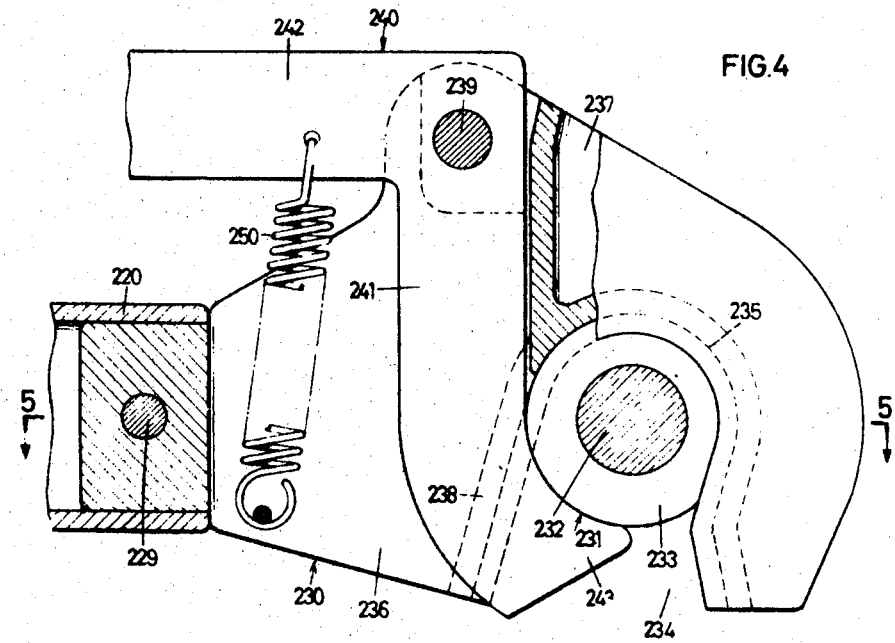
FIGURE 4 is an enlarged sectional view of part of the coupling means, taken along the line 4—4 in FIGURE 5.
Figure 5:
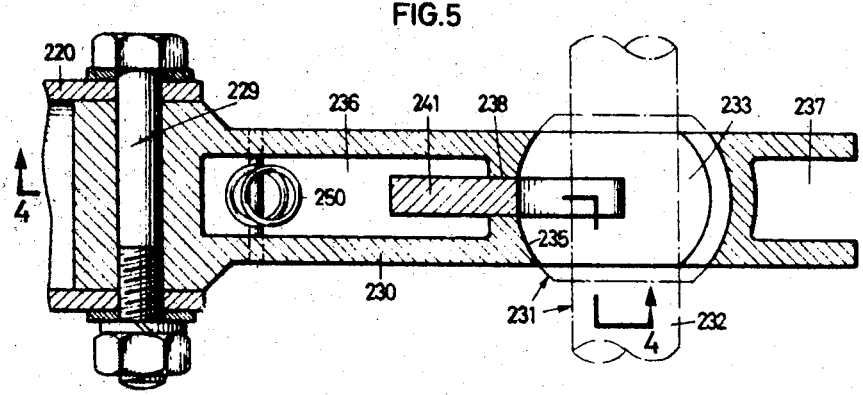
FIGURE 5 is a cross section along the line 5—5 in FIGURE 4.

A hook member 230 is inserted in the end of the outer tubular section 220 and secured by a transverse pin 229, the hook member 230 serving to connect the drawbar 212 with a towing member 231 of an object (not shown) to be towed. The towing member 231 comprises a cylindrical trunnion 232 connected to the object (e.g. an agricultural implement) over which (in a way not shown here) a ball member 233 is fitted (FIGURE 4). The hook member is channel-shaped or bifurcated with the open side 234 of the hook facing downwardly and provided with an approximately semicircular bearing surface 235 the curvature of which corresponds to the ball member 233 and engages the towing member 231 from above.

The hook member 230 is provided with slot-shaped forward and rearward recesses 236 and 237 respectively, the recess 236 being connected with the open side 234 of the hook by a slot 238.

A bell crank lever 240 with lever arms 241 and 242 (FIGURE 4) is pivoted on the upper part of the hook member 230 by means of a pivot pin 239. The shorter lever arm 241 extends downwardly from the pin 239 and has a hook-shaped end 243 which passes through the slot 238 on rocking movement about pivot pin 239. The lever 240 constitutes a retaining member which, in its operative position, grips the towing member 231 from below and thus secures the said member 231 against escape from the coupling means.

The longer lever arm 242 of the lever 240 extends forwardly so as to come within reach of the tractor driver, and bears at its forward end an elongated hole 244 in which a locking device 246 (FIGURE 8) is secured by a cross pin 245. The locking device has two upper parallel fork arms 247 which are provided with vertical elongated holes 248 which intersect the hole 244 and through which the cross pin 245 also passes, securing the arms 242 and 247 together.

The locking device 246 also has two lower vertically downwardly extending fork arms 249 of square cross section which are sliding fits within the respective guide slots 226, the arms 249 being spaced apart by a distance substantially equal to the distance between the slots 226, i.e. approximately the diameter of the annular grooves 224. The fork arms 249 can thus engage in the square-section guide slots 226 from above and can be pushed into the position shown in FIGURE 8 whenever one of the annular grooves 224 is disposed in the same transverse plane as the slots 226. The inner tubular section 219 is thereby locked relative to the outer tubular section 220 against longitudinal movement.

A tension spring 250 extends between the hook member 230 and the lever arm 242, holding the latter in its operative position, shown in FIGURE 4.

The mode of operation of the coupling means will be clear from the foregoing description. If, for example, an agricultural implement is to be coupled with the tractor 210, first the lower coupling trunnions of the implement are coupled with the two lower drawbars (not shown) of the three-point towing linkage by means of, for example, rapid coupling devices. The upper towing drawbar 212 is at first raised, under the action of spring 215, so that it is within the driver's reach. When the lower drawbars have been coupled the drawbar 212 is lowered by raising the lever 240, e.g. from the driving seat (not shown) of the tractor, this movement also rocking the lever 240 against the action of the tension spring 250 to clear the opening 234 and open the coupling means. At this time the locking device 246 is disengaged from the annular grooves 224 and the outer tubular section 220 can be pushed telescopically over the inner section 219 to adjust the length of the drawbar 212.

When the towing member 231 is engaged in the hook member 231, the lever 240 is released, so that the lever arm 242 is drawn downwardly by the tension spring 250 and the hook-shaped end 243 of the lever arm 241 engages the member 231 from below, as shown in FIGURES 1 and 4, closing the coupling means.

At the same time the locking device 246 is engaged with the guide slots 226 in the outer section 220, so that by aligning one of the grooves 224 with the slots 226, the lower fork arms 249 of the locking device 246 can be engaged with said annular groove 224 and thus provide coarse adjustment of the length of the drawbar 212.

The slots 244 and 248 in the lever arm 242 and the fork arms 247 allow a certain play between the two arms 242 and 246, thereby preventing the locking device 246 from binding in the square guide slots 226, and allowing the lever arm 242 to be raised before the fork arms 249 of the locking device 246 release the two tubular drawbar sections 219 and 220 from each other.

In order to effect fine adjustment of the length of the drawbar 212, the inner tubular member 219 can be screwed along the thread 221 of the member 218 by means of the handwheel 227. The annular grooves 224 permit rotation of the inner section 219 without it being necessary to uncouple the fork arm 249 from the inner section 219.

Figure 10:
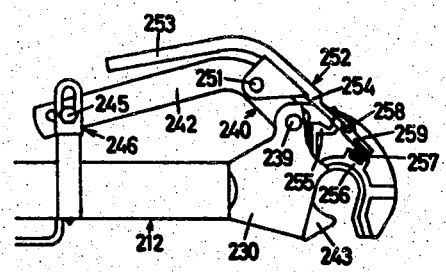
FIGURE 10 shows the coupling means of FIGURE 9 in the closed but unlocked position.
Figure 9:
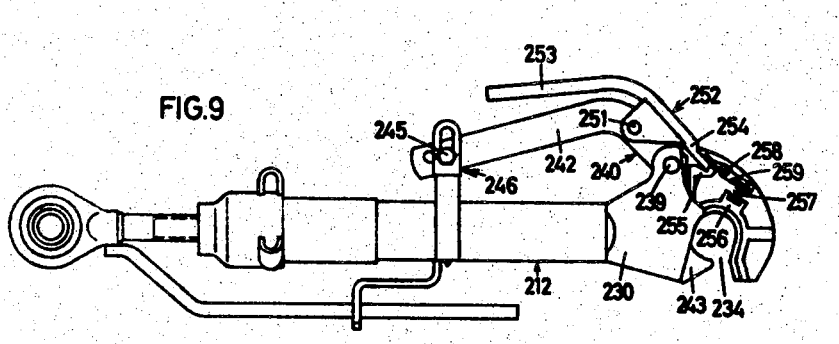
FIGURE 9 shows a further embodiment of coupling means according to the invention in the closed and locked position.
Figure 11:
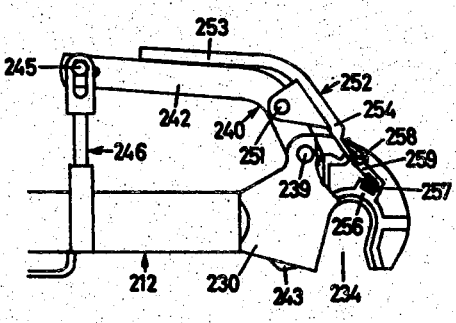
FIGURE 11 shows the coupling means of FIGURE 9 in an open position which atthe same time allows the effective length of towing bar to be adjusted.

In FIGURES 9 to 11 the same index symbols are used to indicate parts corresponding to those of FIGURES 1 to 8.

The retaining member comprises a coupling lever 240 mounted on the hook member 230 of the towing drawbar 212 by means of a pivot pin 239. One arm of the lever 240 terminates in a hook-shaped end 243 which partially closes the open side 234 of the hook member 230 (FIG- URE 9). The other arm 242 of the lever 240 is connected by a pin 245 to a locking device 246, which serves to lock the drawbar 212 at its adjusted length.

The coupling lever 240 is urged into the operative position (FIGURE 9) by a spring (not shown) and is connected by a pivot pin 251 to a locking lever 252. The locking lever 252 has a first arm 254 which engages a locking catch 255 mounted on the hook member 230, the end of the arm 254 resting in a detent in the locking catch 255. A second arm 253 of the locking lever 252 extends over the arm 242 of the coupling lever. A thrust spring 257, supported at one end by a stiffening rib 256 of the hook member, acts on one arm of an intermediate lever 259 pivoted at 258 on the hook member 230 to push the end of the first lever arm 254 into the detent of the locking catch 255.

In FIGURE 9 the coupling means is shown in the closed position. In this position a towing member (not shown) such as a ball member 233 as shown in FIGURES 1 to 8, would be gripped by the hook member 230 and locked by the hook-shaped end 243 of the coupling lever 240 under the influence of the coupling lever spring. The arm 242 of the coupling lever 240 serves also to effect the longitudinal adjustment of the upper coupling bar 212, by means of the locking device 246. The first arm 254 of the locking lever 252 engages, under the influence of the locking spring 257, against the detent of the locking catch 255, so that the coupling lever 240 is thereby locked against clockwise rotation, that is to say, against pivoting in the opening direction.

When it is desired to unlock the coupling lever 240, the operator, gripping the two levers 242 and 253 with his hand, first pushes the lever 253 towards the lever 242, against the spring 257, causing the end of the lever arm 254 to disengage from the detent in the locking catch 255, as shown in FIGURE 10. The operator then rotates the lever arm 242 away from the coupling bar 212 (i.e. clockwise as illustrated), whereby the coupling lever 250 is moved into the position shown in FIGURE 11. In this position the hook-shaped end 243 is retracted clear of the open side 234 of the hook member 230 and at the same time the locking device 246 is unlocked.

The drawbar 212 can then be coupled to or uncoupled from the towing member, as the case may be, while at the same time the drawbar 212 can be adjusted to the desired length. As soon as the operator releases the lever 242 the coupling means returns automatically to the closed position shown in FIGURE 9.

I claim:

1. Coupling means for coupling to a towing member an object to be towed, said coupling means comprising a towing bar including at least two sections longitudinally adjustable relative to each other; a hook member connected to one end of said towing bar, said hook member having an open side; a retaining member cooperating with said hook member and being movable between an operating position in which it closes, at least partially, the open side of said hook member and an inoperative position; locking means movable between a locking position cooperating with said two sections of said towing bar for locking the same in at least one position against movement in longitudinal direction with respect to each other, and an unlocked position; and operating means connected to said retaining member and said locking means for moving said retaining member to said operative position and for also moving said locking means to said locking position.

2. Coupling means according to claim 1 in which the towing bar comprises two concentric tubular sections telescoping into each other, the inner section being provided with a series of spaced apart recesses, and the outer section being provided with at least one aperture and in which said locking means comprises a locking member provided for engagement in both the aperture and a selected said recess to lock said sections longitudinally relative to each other.

3. Coupling means according to claim 2 wherein the outer tubular section has a tubular wall which has two diametrically opposed apertures therein opening into the inner section, said recesses comprising axially spaced annular grooves on the inner section and the locking member being forked and having two locking arms which engage in respective said apertures and one of said annular grooves to lock the sections relative to each other.

4. Coupling means as claimed in claim 2 wherein said respective channel-section guide members enclose said at least one aperture in the outer tubular section and define with the respective apertures rectangular section slots.

5. Coupling means as claimed in claim 2 wherein means are provided for fine adjustment of the length of the towing bar additionally to the coarse adjustment obtainable by relative longitudinal movement of said sections.

6. Coupling means as claimed in claim 5 wherein the inner section of the towing bar comprises two parts in screw-threaded engagement with each other to permit fine adjustment of the length of the towing bar by relative rotation of said parts.

7. Coupling means as claimed in claim 1, wherein said open side of said hook member faces downwardly, and wherein said retaining member is pivotally mounted on said hook member.

8. Coupling means for coupling to a towing member an object to be towed, said coupling means comprising a towing bar; a hook member provided at one end of said bar and having an open side facing downwardly; a retaining member pivotally mounted on said hook member; locking means for locking said retaining member in an operative position in which it closes, at least partially, the open side of said hook member to prevent disengagement of a towing member therefrom; a locking lever pivotally mounted on said retaining member; a locking catch provided on said towing bar, said locking lever engaging said catch so as to be held by the latter in a locking position in which said locking lever maintains said retaining member in said operative position.

9. Coupling means according to claim 8 in which the locking lever is spring-urged into its locking position.

10. Coupling means according to claim 8 in which the locking lever has a first lever arm which engages the locking catch and a second lever arm and a manually actuated third lever arm on the retaining member is disposed near the second lever arm so that an operator can actuate said second and third lever arms simultaneously with one hand.

11. Coupling means according to claim 9 comprising a detent provided on the locking catch, an intermediate lever mounted on the towing bar and a spring acting on the end of the first lever arm to urge said first lever arm into a locking position in which it engages said detent.

12. Coupling means including a towing bar for coupling to a towing member of an object to be towed, said coupling means comprising a movable coupling member, means for operating said coupling member, said towing bar comprising at least two sections which are adjustable longitudinally to each other, means for locking said two sections against relative longitudinal movement and operable means connecting said operating means to said locking means and adapted for common operation of these said two means.

13. In combination with a tractor having a driver's seat and a three-point towing linkage, coupling means for coupling said tractor to an object to be towed thereby and comprising a towing bar having at least two sections adjustable longitudinally with respect to each other; means for locking said two sections against relative longitudinal movement; a movable coupling member connected to said towing bar; means for operating said coupling member; and operable means connecting said operating means to said locking means for common operation of said last-mentioned two means, said towing bar forming an upper link of said three-point towing linkage, and is arranged behind said driver's seat in such a manner that said operable means is operable by hand from said driver's seat.

References Cited

UNITED STATES PATENTS

| 2,727,757 | 12/1955 | Sawyer et al. | 280—504 |
| 2,737,400 | 3/1956 | De Witt | 280—504 |
| 3,312,478 | 4/1967 | Knaapi | 280—479 X |

FOREIGN PATENTS

| 835,995 | 4/1952 | Germany. |
| 272,447 | 3/1951 | Switzerland. |

OTHER REFERENCES

Karnath (II): German DAS, No. 1,062,553, published July 30, 1959, copy of reference in 280/504.

LEO FRIAGLIA, *Primary Examiner.*